(12) United States Patent
Müller et al.

(10) Patent No.: US 10,407,024 B2
(45) Date of Patent: Sep. 10, 2019

(54) ASSEMBLY MODULE

(71) Applicant: Huf Hülsbeck & Fürst GmbH & Co. KG, Velbert (DE)

(72) Inventors: Oliver Müller, Velbert (DE); Helmut Schumacher, Coesfeld (DE); Norbert Heller, Grefrath (DE); Mirko Schindler, Velbert (DE); Bernd Ette, Wolfsburg (DE); Nadine Sticherling, Essen (DE); Alexander Ziegler, Wülfrath (DE); Jean Malabo Yomkil, Essen (DE); Stefan Mönig, Schwelm (DE); Iko Lindic, Essen (DE); Christof Hache, Velbert (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 15/115,648

(22) PCT Filed: Jan. 7, 2015

(86) PCT No.: PCT/DE2015/100011
§ 371 (c)(1),
(2) Date: Jul. 29, 2016

(87) PCT Pub. No.: WO2015/113557
PCT Pub. Date: Aug. 6, 2015

(65) Prior Publication Data
US 2017/0166169 A1 Jun. 15, 2017

(30) Foreign Application Priority Data
Jan. 31, 2014 (DE) .................. 10 2014 101 190

(51) Int. Cl.
*E05B 81/78* (2014.01)
*B60R 25/24* (2013.01)
(Continued)

(52) U.S. Cl.
CPC ............. *B60R 25/24* (2013.01); *B60Q 1/30* (2013.01); *B60Q 1/323* (2013.01); *B60R 11/04* (2013.01);
(Continued)

(58) Field of Classification Search
CPC .......... G06K 9/00369; G06K 9/00791; G06K 9/209; G06T 7/20; G06T 2207/30196;
(Continued)

(56) References Cited

U.S. PATENT DOCUMENTS

2002/0036830 A1* 3/2002 Schofield ............... B60N 2/002
359/601
2008/0122597 A1* 5/2008 Englander ............... B60Q 1/24
340/433
(Continued)

FOREIGN PATENT DOCUMENTS

| CN | 101519935 A | 9/2009 |
|---|---|---|
| CN | 101784424 A | 7/2010 |

(Continued)

OTHER PUBLICATIONS

First Office Action for related Chinese application No. 201580006791.1 dated Mar. 26, 2018, with its English translation, 14 pages.
(Continued)

*Primary Examiner* — Benyam Haile
(74) *Attorney, Agent, or Firm* — Rudy J. Ng; Bret E. Field; Bozicevic, Field & Francis LLP

(57) ABSTRACT

The invention relates to an assembly module (20) for a motor vehicle, comprising an optical sensor system (30), which can be used to a) monitor a detection area (21) on the outside of the motor vehicle (1) in order to determine the proximity of a user (10), b) in the event a user (10) is detected in the detection area (21), a signal for starting an authentication test between an ID transmitter (13) and an
(Continued)

Figure 1:
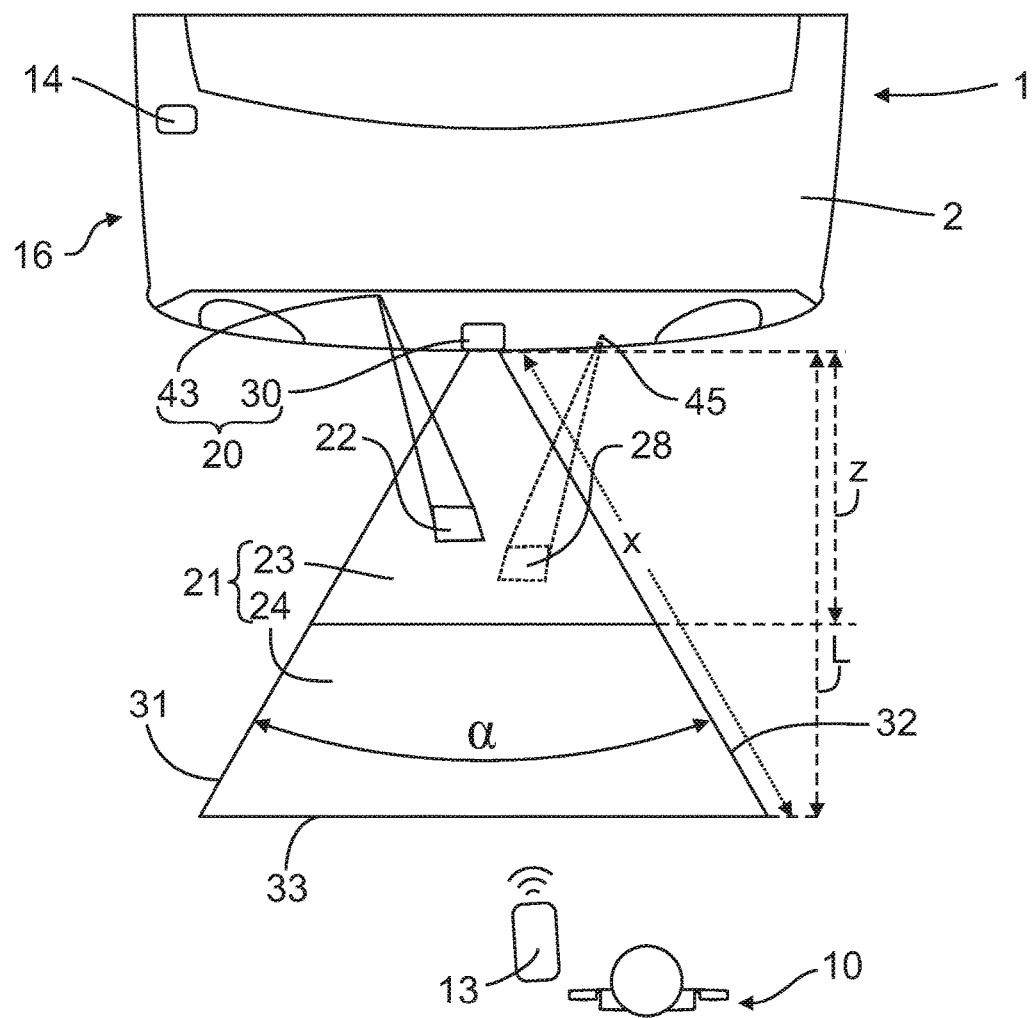

access control system (14) of the motor vehicle (1) is triggered.

26 Claims, 6 Drawing Sheets

(51) Int. Cl.
*G07C 9/00* (2006.01)
*B60Q 1/30* (2006.01)
*B60Q 1/32* (2006.01)
*B60R 11/04* (2006.01)
*G06K 9/00* (2006.01)

(52) U.S. Cl.
CPC .............. *E05B 81/77* (2013.01); *E05B 81/78* (2013.01); *G07C 9/00309* (2013.01); *G06K 9/00369* (2013.01); *G06K 9/00791* (2013.01); *G07C 2009/00769* (2013.01); *G07C 2209/64* (2013.01)

(58) Field of Classification Search
CPC . G06T 2207/30252; G06T 2207/30248; B60R 2300/105; B60R 25/10; G01C 21/3407; E05B 81/77; E05B 81/78
See application file for complete search history.

(56) References Cited

U.S. PATENT DOCUMENTS

| | | | | |
|---|---|---|---|---|
| 2010/0328644 A1* | 12/2010 | Lu | ........................ | G01S 7/4802 356/5.01 |
| 2011/0235018 A1* | 9/2011 | Mori | ........................ | G01C 3/08 356/5.01 |
| 2012/0033077 A1* | 2/2012 | Kitaura | ................. | G06T 7/0065 348/148 |
| 2014/0198093 A1* | 7/2014 | Nambi | ..................... | G09G 3/36 345/212 |
| 2014/0300548 A1* | 10/2014 | Lye | ..................... | G06F 3/03543 345/163 |
| 2014/0330486 A1* | 11/2014 | Gehin | ................. | B60R 25/2054 701/49 |
| 2015/0009147 A1* | 1/2015 | Chen | ................... | G06F 3/03543 345/166 |
| 2015/0175072 A1* | 6/2015 | Sabeti | ..................... | H04N 7/183 348/148 |
| 2017/0167169 A1* | 6/2017 | Sobecki | ................. | E05B 81/77 |

FOREIGN PATENT DOCUMENTS

| | | | |
|---|---|---|---|
| CN | 103527030 A | 1/2014 | |
| DE | 102005032402 B3 | 9/2006 | |
| DE | 102007050094 A1 | 4/2009 | |
| DE | 102009023594 A1 | 12/2010 | |
| DE | 102010056171 A1 | 6/2012 | |
| DE | 102011115760 A1 | 4/2013 | |
| WO | WO 2007006514 A1 * | 1/2007 | .......... B60Q 1/0023 |
| WO | WO2013037806 A1 | 3/2013 | |

OTHER PUBLICATIONS

Notice of Reasons for Rejection for Japanese Application No. 2016-567135 dated Dec. 4, 2018, with its English translation, 10 pages.

* cited by examiner

ASSEMBLY MODULE

The present invention relates to an assembly module for a motor vehicle, with an optical sensor system as described herein. The invention further relates to a method for triggering at least one signal for a motor vehicle as described herein.

DE 10 2008 021 989 A1 discloses a light source, which forms a control panel visible to the user. The control panel is limited to a small partial region of a floor surface that corresponds to roughly the size of two shoeprints. The control panel is formed when an approaching person has been detected by a sensor (not mentioned in any more detail). The user can consciously touch the control panel with a foot, and thereby start an authentication check for an access authorization.

The disadvantage to this is that an approaching person must first be detected with an additional sensor before the authentication check is started. In addition, the user must already be in proximity to the motor vehicle and consciously step on a visible control panel in order to start the authentication check. As a consequence, the user must become active so as to start the authentication check. This is time consuming for the user.

It is further known to start an authentication check with a capacitive sensor. To this end, however, the user must already perform an opening motion, e.g., grip a door handle of a motor vehicle.

Therefore, the object of the present invention is to provide an assembly module for a motor vehicle and a method for triggering at least one signal for a motor vehicle, which eliminates at least one of the aforementioned disadvantages, in particular allows an authentication check to be started unnoticed and/or early for the user and/or in a targeted manner for an approaching user.

An assembly module is proposed for achieving the object. Advantageous further developments of the assembly module are indicated as described herein. The object is further achieved by a method as described herein. An advantageous further development is indicated in the dependent method claim. In addition, an authentication system with an assembly module according to the invention, an ID transmitter and an access control system is described herein. Features and details described in conjunction with the assembly module according to the invention here also apply in conjunction with the method according to the invention and vice versa. The features mentioned in the claims and specification can here be essential to the invention whether taken in isolation or in combination. Also protected is a motor vehicle with an assembly module according to the invention and/or with an authentication system according to the invention.

According to the invention, the assembly module comprises an optical sensor system that is suitable for a) monitoring a detection region lying outside of the motor vehicle so as to determine the proximity of a user, b) triggering a signal, in the event the user is detected in the detection region, for starting an authentication check between an ID transmitter and an access control system of the motor vehicle.

It is essential to the invention on the one hand that the optical sensor system can already determine the proximity of a user. This eliminates the need for an additional sensor that determines the approach of a user. The proximity of the user is determined via the detection of the user in the detection region. However, it is also conceivable that additional requirements on the detection of the user in the detection region must be satisfied before a signal is triggered for starting the authentication check. The proximity of a user involves the proximity to the optical sensor system and/or to the motor vehicle. In particular, step b) takes place after step a).

It is further essential to the invention that an optical sensor system monitors the detection region. By using an optical sensor system, user detection can be focused on the predefined detection region outside of the motor vehicle that can be delimited as a space portion. The size and shape of the detection region are derived from the structural design of the optical sensor system. For example, it is here possible to fix the detection region in such a way as to recognize the user prior to introducing an opening motion in the detection region. As a consequence, the user can be detected earlier than when using a capacitive sensor. On the other hand, it is possible to limit the detection region to a predefined space portion, e.g., which would not be possible when using a high-frequency signal for detecting a user. Therefore, only the users located in proximity to the optical sensor system can be detected. As a result, the detection region fixed by the optical sensor system can be used to detect a user early on the one hand, and in a targeted manner on the other.

Because the detection region is monitored and the authentication check is started if the user is recognized in the detection region, in particular no active action by a user is necessary to start the authentication check. Instead, the start of the authentication check is preferably introduced unnoticed by the user. As a consequence, it can be provided that the optical sensor system introduce a passive-keyless entry check. A passive-keyless entry check is understood as a process in which an authentication check takes place unnoticed by the user. The authentication check in a passive-keyless entry need not be introduced by a conscious action on the part of the user, e.g., operating the ID transmitter.

For example, the assembly module can be designed for installation in such a way that the detection region is located at least partially above a floor surface on which the motor vehicle is standing. As a result, the detection region is not only limited to a small partial area of a floor surface in front of a motor vehicle. It can be the case that the detection region in proximity to the motor vehicle begins above the floor surface, and then runs at an inclination until reaching the floor surface. The detection region here ends on the floor surface. Alternatively, the detection region can end at least partially above the floor surface. In a special embodiment, the detection region is located completely above the floor surface. One end of the detection region can in this case result at a certain distance from the optical sensor system due to an excessively low light intensity with which the detection region is illuminated.

The detection region can preferably become smaller toward the optical sensor system as viewed from above. As a result, only users who will prospectively approach the optical sensor system and/or motor vehicle are specifically detected. The detection region preferably has an axially symmetrical design. In particular, the symmetrical axis of the detection region can essentially be designed parallel to an optical axis of the optical sensor system and/or orthogonal to a surface of the motor vehicle. As a result, various directions of movement by the user are equally acquired. The detection region preferably begins at a distance y from the optical sensor system with $0 \text{ cm} \leq y \leq 15 \text{ cm}$.

It can be provided that the optical sensor system or entire assembly module be designed to be situated on the vehicle rear, e.g., behind the rear window, in a handle strip, in an emblem, in a taillight, behind a reflector, on a bumper and/or in a gap between two components. Alternatively or additionally, the assembly module can be suitably attached to a vehicle side, e.g., to a B-pillar. As a result, the optical sensor system can be used to monitor various detection regions, in which a user approaches the motor vehicle in a conventional manner. In particular, the optical sensor system or the entire assembly module can be concealed behind a layer that is outwardly opaque, but translucent to the light of the optical sensor system. For example, the bumper to which the optical sensor system is mounted can be painted.

The optical sensor system can comprise an optical sensor. The optical sensor can be designed to receive light from the detection region. The optical sensor records images of the detection region. To this end, the optical sensor can comprise a lens system. In particular, each image can be composed of a total number of pixels. The optical sensor can comprise an image sensor having the total number of pixels. The image sensor can be a CMOS sensor and/or an LDPD sensor. The LDPD sensor (lateral drift field photodetector) is described in publication DE 10 2009 020 218 B3. The LDPD sensor is suitable to be especially quickly evaluated.

The optical sensor system can comprise a light module for emitting light. The light serves to allow the detection region to form. To this end, the light module can comprise a lens system. It can be provided that the detection region be invisible to the user. For this purpose, the light module emits light that is not in the visible range. In particular, the light can involve infrared rays, especially near infrared rays. The light module can comprise only one light source. Alternatively, the light module can comprise several light sources. The light sources can be arranged around the optical sensor. For example, light sources can be arranged to the left and right of the optical sensor. Alternatively, the light sources can be arranged around the circumference of the optical sensor. The light can be laser light.

In particular, the detection region can be formed by overlapping a transmitting region of the light module and a receiving region of the optical sensor. The detection region is preferably formed by the complete overlapping of the transmitting region and receiving region. The transmitting region of the light module is derived from the area in which the light module emits light of sufficient intensity. The receiving region is derived from the area from which the optical sensor can receive light. The transmitting region of the light module can be composed of the transmitting regions of the individual light sources. Alternatively, the transmitting region can be limited to the overlapping of the transmitting regions of the individual light sources. The receiving region and/or the transmitting region of each light source can comprise a truncated cone-shaped area. The tip of the truncated cone-shaped area can here be arranged on the optical sensor or on the light source. The detection region preferably comprises a truncated cone-shaped area. The respective truncated cones can comprise a round or elliptical base area. In particular, the truncated cone-shaped area of the detection region can correspond to an inclined truncated cone.

The optical sensor system can further comprise a monitoring unit for evaluating the optical sensor. The monitoring unit can be designed to evaluate images recorded by the optical sensor. Images of the detection region can here be involved.

It can be provided that the optical sensor comprise an infrared filter and/or a polarization filter. As a result, at least a portion of the extraneous light can be filtered out. For example, the extraneous light can be sunlight or light from an artificial light source, e.g., garage light. The light module can also comprise a polarization filter.

It can be that the optical sensor system is designed to record recognition images and comparison images and potentially evaluate the latter. Recognition images come about with the help of the reflection of the emitted light of the light module. Comparison images come about solely with the help of extraneous light. The light module emits no light for the comparison images to come about. By comparing a recognition image and a comparison image, the monitoring unit can detect the extraneous light. In this way, the monitoring unit can generate a modified recognition image, from which the extraneous light has been removed. The optical sensor system can be designed in such a way that a comparison image is recorded after a predefined number of recognition images.

The aforementioned measures make it possible for the optical sensor system to generate an image that is produced only by the light of the light module.

The monitoring unit can recognize a user in the detection region. To this end, the monitoring unit evaluates the images received by the optical sensor based on predefined criteria. The monitoring unit can trigger the signal for starting the authentication check in step b).

The assembly module can comprise an attachment element, in particular an installation plate, so as to fasten individual elements of the optical sensor system, i.e., the optical sensor, the light module and/or the monitoring unit. Alternatively or additionally, the assembly module can comprise a housing that at least partially envelops the optical sensor system. The monitoring unit can be designed together with the access control system. In particular given a light module with several light sources, the attachment element can be designed like a spherical segment.

It can be that the optical sensor system is designed to continuously monitor the detection region with the motor vehicle parked until authentication is successful. Continuously can here mean that the optical sensor system is designed to record and/or evaluate an image after each predefined timespan t. In particular the timespan t can measure 1 ms≤t≤3 s, especially preferred 0,05s≤t≤0,5s. The optical sensor system can monitor the detection region from the time the motor vehicle is parked until an authentication has been successfully made. For example, the continuous monitoring can be performed starting at the point when no ignition key is inserted and/or the motor vehicle is locked.

In order to be able to continuously monitor the detection region, enough electrical power must be made available to the optical sensor system and/or the authentication system over a prolonged period of time. To this end, for example, a battery of the motor vehicle can provide electrical power to the optical sensor system and/or the authentication system. To ensure that the parked motor vehicle remains functional even after several weeks of being parked, it is necessary that the optical sensor system and/or the authentication system only require a slight amount of electrical power. The following measures serve this purpose. For example, the optical sensor system can require a slight amount of electrical power while emitting the light and/or a slight amount of electrical power while evaluating the optical sensor. In addition, the optical sensor system can be designed in such a way that the signal is only rarely triggered for starting the authentication check.

It can be provided that each point in the detection region be spaced at most a first distance x from the optical sensor, wherein x measures 1.3 m≤x≤2.5, preferably 1.5 m≤x≤2.0 m, with x=1.7 m being especially preferred. As a result, the electrical power of the light module can be limited.

In particular the detection region can correspond to a two-dimensional geometric figure as viewed from above. The geometric figure comprises a side located the farthest away from the optical sensor system, which will be referred to as the base below. In particular, the base can comprise a second distance from the optical sensor, thereby defining a length L of the detection region. In particular, the base can be designed as a straight line. In particular, the base can run orthogonal to an optical axis of the optical sensor. Having the base limit the detection range makes it possible to keep down the computing time of the monitoring unit. The length L can measure 1.2 m≤L≤2 m, preferably 1.3 m≤L≤1.6 m, with L=1.5 m being especially preferred. As a result, the electrical power of the light module can be limited.

The detection region can comprise two rays as viewed from above. The detection region need not be symmetrical as viewed from above. In particular, the two rays lead away from the optical sensor system. In particular, the two rays form an angle α of 30°≤α≤110°. It can here be that the two rays of the detection region must be lengthened to form the angle α. For example, this can happen when the detection region comprises the form of a trapezoid as viewed from above. In particular, an angle α can be provided within a range of 60°≤α≤110°. This angular range is selected so that a user approaching the optical sensor in proximity to the vehicle gets into the detection region. This angular range makes sense above all for side doors. This is because only a limited space next to the side door is available in parking structures or garages, so that a user approaches the motor vehicle at an acute angle, e.g., of 35°. Alternatively, the angle can preferably be designed within the range of 30°≤α≤90°, especially preferably within the range of 30°≤α≤60°. This angular range makes sense especially if a user will move nearly orthogonally toward the motor vehicle, This is the case in particular in the rear area. Selecting the small angle prevents users who are merely passing by the motor vehicle from entering into the detection region, and thereby triggering the start of a more extensive check, e.g., the authentication check. This makes it possible to economize on electrical power.

An optical axis of the light module and/or light source and the optical axis of the optical sensor can comprise a distance a. The selected distance a is preferably small. For example, it can be that the distance lies within a range of 0 cm≤a≤5 cm, preferably 1 cm≤a≤3 cm, with a=2 cm being especially preferred. This allows as many light beams of the light module as possible to also get into the receiving region of the optical sensor, so that the light module must emit light of a low intensity. As a result, the light module has to consume less electrical power.

It is likewise conceivable to configure the receiving region so spaciously that the receiving region completely envelops the transmitting region. As a result, all light beams emitted by the light module are received by the optical sensor, thereby economizing on electrical power.

It can be that an optical sensor system be switchable between a sleep mode and operating mode. The optical sensor system can here require less electrical power in the sleep mode than in the operating mode.

It is also conceivable that a low resolution be selected for the optical sensor. For example, an optical sensor can be selected that contains just a pixel number with which a desired object, e.g., a user or a body part of a user, can be detected in the detection region with minimally only two pixels. The body part can be a hand or foot of a user. For example, the image sensor of the optical sensor and/or the image to be evaluated can contain between 500 and 1500 pixels. The image to be evaluated can here be displayed on the entire image sensor or only a portion of the image sensor. Using the already described LDPD sensor also makes it possible to economize on electrical power, since the LDPD sensor is suitable for use at a low light intensity, so that a light module can also be used with a slight amount of electrical power.

Alternatively or additionally, it is conceivable for the monitoring unit to be designed to evaluate only a portion of the image recorded by the optical sensor in step a) while monitoring the detection region. As a result, the monitoring unit requires less electrical power. In particular, the monitoring unit only evaluates a number of pixels in step a) that is less than the total number of pixels. The evaluated pixels can be uniformly distributed over the image sensor and/or over the image to be evaluated. For example, only every n-th pixel can be evaluated with 2≤n≤30. In particular, only each second pixel can be evaluated. In particular, the only partial evaluation of the optical sensor can take place only intermittently. In particular, the only partial evaluation of the optical sensor can take place in the sleep mode.

In like manner, selecting a large timespan t makes it possible to save energy. For example, it is conceivable that the selected timespan t be greater in the sleep mode than in the operating mode. In other words, the frame rate is lower in the sleep mode than in the operating mode.

The light emitted by the light module can be pulsed. It is conceivable that the pulse frequency be lower in the sleep mode than in the operating mode.

Step a) also comprises the recognition of a user. In general, recognizing any object in the detection region just once can suffice for recognizing a user and trigger the signal for starting the authentication check. To ensure that the signal for starting the authentication check is only triggered rarely, and thus that electrical power is economized, it is possible to place special requirements on the recognition of a user in the detection region.

For example, it is conceivable that a user in the detection region is only recognized if an object is located in the detection region for a predefined detection duration d. Under certain conditions, objects that remain in the detection region for less time than timespan t will not be detected already as the result of the time span t selected. However, it can also be that the detection duration d selected exceeds the timespan t. For example, the selected d can measure 0.5 s≤d≤10 s, preferably 1 s≤d≤5 s. As a result, objects that pass quickly through the detection region cannot be recognized as users.

It can further be provided that a user in the detection region is only recognized if an object of a predefined size is located in the detection region. For example, the number of pixels documenting the presence of the object in the optical sensor must here reach a predefined minimum number. This minimum number and/or the predefined size can be stored in the monitoring unit. For example, the size can correspond to the size of a grown person.

Furthermore, it is possible that a user in the detection region only be recognized if the object moves in the detection region. To this end, for example, the pixels that display the object in at least two images recorded in chronological succession, in particular recognition images, can be compared. Additionally or alternatively, for example, a distance between the object and optical sensor can be measured given at least two images recorded in chronological succession, in particular recognition images. If varying distances are detected, the object in the detection region has moved. In order to be able determine a distance between the object and optical sensor, for example, a time of flight measurement can be performed. For example, one or more light pulses are here sent out by the light module, and the time required by the light pulse to arrive at the object, and from there to the optical sensor, is measured. The time is here directly proportional to the distance of the object.

Furthermore, it is possible that a user in the detection region only be recognized if the object in the detection region approaches the optical sensor system and/or motor vehicle. In other words, no longer is strictly a movement by the object in the detection region enough to trigger the start of the authentication check. Only if the distance between the object and optical sensor and/or to the motor vehicle diminishes is a signal for starting the authentication check triggered. To this end, the distance between the object and optical sensor is measured given at least two images recorded in chronological succession, in particular recognition images. In order to measure the distance, a time of flight measurement can be performed.

The requirements placed on user recognition, i.e., the detection duration, the size of the object, the movement of the object, the approach of the object, can be combined in any way desired. For example, it can be that the object has a predefined size, and must approach the optical sensor in order to be recognized as a user and trigger a signal for starting an authentication check.

It is conceivable that the optical sensor system be designed in such a way that the detection region is divided into at least two zones, a proximate zone and a remote zone. The proximate zone is spaced a smaller distance apart from the optical sensor system than the remote zone. A boundary between the proximate zone and remote zone can be provided at a distance z to the optical sensor system. For example, z=0.6 m. The boundary can be a straight line, and in particular run parallel to the base.

It is conceivable that a user can only be recognized if the user is located in the proximate zone. In particular, at least one requirement for user recognition is first checked in the proximate zone. In particular, only in the proximate zone is a check performed to determine whether the object is approaching the optical sensor and/or the motor vehicle.

It can be that a request for user recognition be checked in the remote zone. For example, the size of the object can be checked in the remote zone. In particular, the requirement involved can differ from the one checked in the proximate zone. The requirement selected in the remote zone preferably necessitates less electrical power than the requirement in the proximate zone. It can be that a measurement be performed on the distance between the object and optical sensor only in the proximate zone. This division also makes it possible to economize on electrical power. It is conceivable that this optical sensor system be in the sleep mode when an object is in the remote zone, and in the operating mode when an object is in the proximate zone.

Likewise, energy can be economized by using light with varying wavelengths. The detection region can be monitored until any object in the detection region has been recognized one time using light with a longer wavelength than for the subsequent process of checking additional requirements placed on the detection of a user. For example, light with a wavelength of 905 nm can be initially used. If an object is determined in the detection region, light with a wavelength of 800 nm can be used, for example. Alternatively, the wavelength can be shortened when the object moves from the remote zone into the proximate zone.

It can likewise be advantageous to lower the electrical power per light source and/or light pulse. For example, several light sources can be present in the light module. It can likewise be that several light pulses in succession are emitted by the light module, so as to be able to generate an image. The light pulses can be integrated or summed for generating the image. As a result, the electrical power per light pulse can be lowered. In order to be able to perform a distance measurement in this case, a specific time interval is predefined for recording the image. The total intensity of the light pulses obtained in the time interval is correlated with the distance. The optical sensor is preferably arranged on the motor vehicle in such a way as to gather little dirt. For example, the optical sensor system can be situated behind the rear window in the wiper region of the windshield wiper or on the handle strip. Alternatively or additionally, the assembly module can comprise a washer nozzle, with which the optical system can be cleaned. For example, the washer nozzle can here always automatically clean the optical system when the windshield wiper of the front and/or rear window is also activated. A clean optical sensor system requires less light intensity to function, so that this also enables an energy savings.

The optical sensor system can further be suitable for c) monitoring an actuation region that differs from the detection region and lies outside of the motor vehicle upon successful authentication, d) providing an operating signal for the motor vehicle in the event a user intention in the actuation region has been recognized.

The operating signal can be a signal for opening and/or closing a movable part. Alternatively or additionally, the operating signal can be a signal for unlocking and/or locking the movable part. Alternatively or additionally, the operating signal can be a signal for retracting and/or deploying a trailer coupling. In particular, several different user intentions can be determined while monitoring the actuation region, e.g., the user intention to open a movable part, and the user intention to deploy the trailer coupling. In particular, step c) takes place after step b). In particular, step d) takes place after step c).

In particular, the movable part can be a tailgate and/or a side door of the motor vehicle. The tailgate and/or side door can be designed as a sliding door. After the signal for opening the movable part, the movable part can be unlocked. In particular the spring force exerted by a gasket of the movable part allows the movable part to then partially move out of a closed position, and thus partially open. Additionally or alternatively, the operating signal can be a signal that activates a motorized opening and/or closing aid. The motor vehicle here comprises a motor that completely opens and/or closes the movable part.

In particular, the signal for opening and/or closing the movable part can be a signal to an electromechanical door lock. The electromechanical door lock can comprise a bracket that is held in a locked position by a bolt. Given both an unlocking signal and an operating signal for opening the movable part, or alternatively a single operating signal for unlocking and opening, the bolt is moved and releases the bracket of the door lock. The gasket can now move the movable part out of the closed position, and thus partially open the latter.

The at least one part of the actuation region is preferably visible to the user. To this end, the assembly module can comprise a display element, which can be used to emit visible light to make the actuation region at least partially visible to the user. The display element can be designed to make the actuation region visible on the floor surface. The actuation region can be limited to the visualized floor surface. Alternatively, the actuation region can comprise a truncated cone, and end only on the visualized floor surface. An actuation region of the kind described above can be provided in particular for activating the tailgate. Alternatively, the actuation region can lie in the area of the door handle. This is provided in particular for a side door of the motor vehicle. However, the actuation region can also just simply be spaced apart from the display element by a distance or distance range known to the user. The display element can here only indicate that the actuation region is being monitored. The intensity of emitted visible light can depend on the brightness of the ambient light. The brightness of the ambient light can be determined with a brightness sensor.

It can be that several actuation regions are present, and that the user must demonstrate his or her intention in each actuation region for the user intention to be recognized, and the operating signal to be provided.

The user intention is preferably recognized in step c) from a predefined motion. The predefined motion can be the motion of a body part of the user in or on the actuation region. Additionally or alternatively, the predefined motion can involve the motion of a body part of the user into the actuation region and/or out of the actuation region. The body part can be a foot or a hand of the user. It can also be that the predefined motion be specified more precisely. For example, the predefined motion can correspond to a predefined gesture. If various user intentions can be determined while monitoring the actuation region, then different gestures can be assigned to different user intentions. For example, stepping into the actuation region with the foot can make the tailgate open, while moving the hand sideways near the optical sensor will cause the trailer coupling to deploy.

In order to recognize the user intention in step c), the predefined motion must preferably take place within an actuation duration b. If the predefined motion takes place after the actuation duration b, no operating signal is provided.

It is conceivable that the object must be removed from the actuation region within a predefined removal duration so as to provide the signal. Removing an object within a predefined removal duration can be part of the gesture. The user can perceive the beginning of the removal duration. For example, a display element can assume several lighting statuses. In one lighting status, such a display element can emit light with a constant brightness. In another lighting status, for example, the brightness can periodically change. For example, the display element can emit light with a constant brightness at the beginning of the actuation duration. During the removal duration, the display element can blink, for example. The operating signal is provided only when the object, in particular a body part of the user, is removed from the actuation region within the removal duration.

It can be that a measurement be performed on the distance between the body part and optical sensor so as to be able to recognize the motion in the actuation region. In particular the distance given at least two successive images, in particular recognition images, is here measured. The distance can be in a time of flight measurement. It can be that the optical sensor comprises a resolution in which two pixels correspond to the surface of the body part.

It can be provided that the detection region comprises a larger spatial expansion than the actuation region as viewed from above.

The assembly module can be designed in such a way that the detection region ends further away from the motor vehicle than the actuation region as viewed from above. This ensures that the actuation region is located between the user and motor vehicle after a positive authentication. In other words, the user can normally keep moving in the same direction to reach the actuation region. The actuation region can be located within the detection region as viewed from above. Alternatively, it can be provided that the actuation region be located closer to the motor vehicle than the detection region as viewed from above. In particular, the actuation region can adjoin the detection region.

The optical sensor and light module are preferably designed to be used both for monitoring the detection region and for monitoring the actuation region. In other words, the same optical sensor and the same optical light module are used to execute steps a) and c). In particular, the light module can emit the same light in terms of wavelength and/or light pulse duration for monitoring the detection region as for monitoring the actuation region. The structural design of the optical sensor system is preferably not changed. For example, the light module for monitoring the detection region can comprise the same transmitting region as for monitoring the actuation region. Likewise, the optical sensor can comprise the same receiving region for monitoring the detection region as for monitoring the actuation region. To this end, it can be that the optical sensor and/or light module comprise a rigid lens system. As a result of these measures, the optical sensor system can be made especially inexpensive to manufacture. Since the actuation region preferably comprises a lesser spatial expansion than the detection region, it can be that the monitoring unit for monitoring the actuation region only evaluates a portion of the image recorded by the optical sensor in step c). This portion corresponds to the image of the actuation region. The number of evaluated pixels is less than the total number of pixels.

It can be provided that the assembly module and/or motor vehicle comprise at least one means to help the user more easily express his or her intention in the actuation region, so that the operating signal is triggered.

The assembly module can send out an alert signal that the actuation duration will end shortly. For example, the alert signal can be initiated by changing the lighting status of the display element. The alert signal can correspond to another lighting status of the display element. For example, the display element can blink toward the end of the actuation duration. The means follows a corresponding predefined method in the monitoring unit.

The user may likewise find it helpful in expressing his or her intention if the user is guided to the actuation region. This is the case in particular if the user is carrying a large object, and thus unable to see the end surface of the actuation region on the floor surface. To this end, the assembly module and/or motor vehicle can comprise means that are able to generate a signal perceivable by the user, in particular a visible, audible or tactile signal. For example, the assembly module can comprise luminous elements, e.g., LED's. The luminous elements can be arranged in such a way that the luminous elements act as signposts. For example, the luminous elements can be aligned in such a way as to generate markings on the floor surface that lead to the actuation region. Additionally or alternatively, the luminous elements can be arranged side by side. The luminous elements can be turned on in a sequence that shows the user the direction in which the user has to move toward the actuation region. Instead of the luminous elements, this can also be accomplished with existing light elements arranged side by side in the motor vehicle, e.g., the luminous elements of a headlamp, a brake light, blinker or the like. Also conceivable is to provide the user with an acoustically audible instruction as to the direction in which the user must move. To this end, the assembly module can comprise a loudspeaker. Also conceivable is to impart the change in direction to the ID transmitter, which guides the user through different vibrations. Once the user has been notified about a change in direction, the optical sensor system determines the position of the user and the direction in which he or she must move toward the actuation region, and prompts the perceivable means to send out the corresponding signal.

It can likewise be helpful to the user for the position of the actuation region and/or the length of the actuation duration to be variable. This is helpful in particular if a physically impaired user wishes to express his or her intention. Likewise, this is helpful if the actuation region is situated in a position inconvenient to the user. The inconvenient position can here be a permanent one. For example, the actuation region can end at a trailer coupling. Alternatively, the inconvenient position can only be inconvenient for triggering a one-time operating signal, e.g., because the actuation region ends in a puddle. In particular a predefined user action can be provided in order to change the position of the actuation region and/or length of the actuation duration. For example, the user can change the position of the actuation region and/or length of the actuation duration by making an entry in a user menu, e.g., of a motor vehicle control device or an ID transmitter. Alternatively, the predefined user action can be detected by the optical sensor system. In another alternative, the assembly module can be switched over to a learning mode, in which the assembly module learns the changed position of the actuation region and/or changed length of the actuation region.

It can likewise be helpful to the user for the actuation region to again be monitored to determine a user intention to trigger an operating signal once a first actuation duration has ended without the detection of a user intention. This is helpful in particular if the user was distracted and failed to reach the actuation region in time, or made the wrong gesture. Therefore, it can be provided that it be possible to monitor the actuation region several times, in particular two or three times, in succession. The renewed monitoring of the actuation region can be introduced automatically. Alternatively, a predefined user action can be provided so as to again monitor the actuation region for an additional actuation duration. To this end, for example, the user can address a capacitive sensor. Alternatively, the case can involve a predefined user action that is detected by the optical sensor system.

The predefined user action, which is detected by the optical sensor system and initiates a change in the position of the actuation region and/or actuation duration and/or a renewed monitoring of the actuation region for detecting a user intention, can involve the following user actions: a predefined gesture within the actuation and/or detection region, for example moving a body part of the user back and forth, not removing the body part when a removal had been envisaged, the user moving into the detection and/or actuation region and/or out of the detection and/or actuation region. In particular, the body part can be a hand or a foot. It can further be provided that the user leaves the detection region for a predefined time, and then return to the detection region again.

If the actuation region is again monitored to determine a user intention, the display element will also indicate this. If the position of the actuation region is changed, the display element will indicate this. To this end, the display element can comprise several lighting means, e.g., LED's. One or more lighting means each make an actuation region at least partially visible. The actuation region with the changed position preferably lies within the detection region. Depending on what actuation region is being monitored, the corresponding pixels are evaluated.

The invention also comprises an authentication system with an ID transmitter, an access control system and an assembly module according to the invention. The assembly module can here be designed as described and/or claimed. The authentication system is suitable for performing the authentication check for an access authorization. After the assembly module has triggered the signal for the authentication check, the authentication check can be continued. For example, the access control system can send a wakeup signal to the ID transmitter after step b). The ID transmitter can then relay an authentication code to the access control system. The access control system can compare the received authentication code with a stored code. Given a match, i.e., if authentication is successful, a signal can be triggered. This case can involve an unlocking signal. Alternatively involved is a signal for monitoring the actuation region. In this case, the unlocking signal is only triggered if there has been at least one additional signal, in particular the operating signal, and/or another authentication has taken place. In another alternative, the operating signal also comprises the unlocking signal.

It can happen that a position of the ID transmitter is checked during or after an authentication and before triggering the signal. The strength of a signal sent out by an ID transmitter can be used for this purpose. For example, the receive signal strength indicator (RSSI) can be used to this end. For example, ascertaining the strength of the transmitted signal makes it possible to determine whether the user is located in front of, next to or in back of the motor vehicle. In so doing, it can be ensured that only the authorized user himself or herself has entered into the detection region, and expressed his or her user intention in the actuation region. Also conceivable is to cyclically query the RSSI.

The object of the invention is also achieved by a method for triggering at least one signal for a motor vehicle with the following steps:

a) Monitoring a detection region lying outside of the motor vehicle with an optical sensor system, so as to determine the proximity of a user, b) Triggering a signal for starting an authentication check between the ID transmitter and an access control system of the motor vehicle in the event the user is recognized in the detection region.

The signal for starting the authentication check is preferably triggered by the sensor system.

The method according to the invention is preferably a method that can be implemented with an assembly module of the kind described above. In particular, authentication can involve a passive-keyless entry check. Several points essential to the invention will be discussed once again below, wherein reference is made to the description of the assembly module according to the invention and the authentication system according to the invention for more details, which also apply with respect to the method according to the invention.

The detection region can be continuously monitored with the motor vehicle parked until authentication is successful. In this monitoring process, the optical sensor can be evaluated after each predefined timespan t.

The optical sensor system can record recognition images and comparison images and potentially evaluate the latter. Extraneous light can be detected by comparing a recognition image and a comparison image. A modified recognition image from which the extraneous light has been removed can be generated. It can be provided that a comparison image be recorded after a respective predefined number of recognition images.

It can be that an optical sensor system be switchable between a sleep mode and operating mode. The frame rate can be lower in the sleep mode than in the operating mode.

The light emitted by the light module can be pulsed. It is conceivable that the pulse frequency be lower in the sleep mode than in the operating mode. It can likewise be that several light pulses in succession are emitted by the light module, so as to be able to generate an image. The light pulses are integrated or summed for generating the image.

Likewise, the monitoring unit can only evaluate a portion of the image recorded by the optical sensor in step a) while monitoring the detection region.

The requirements placed on user recognition in step a) can include requirements on an object in the detection region or on the detection duration, the size of the object, the movement of the object, and/or the approach of the object to the optical sensor. A time of flight measurement can be used to recognize a motion of the object in the detection region.

It is conceivable that the user can only be recognized when the user is located in a proximate zone of the detection region. In particular, the requirement that the user be recognized only in the proximate zone is verified. Likewise, the detection region can contain a remote zone, the task of which was described above. It is conceivable that the optical sensor system be in the sleep mode when the object is in the remote zone, and in the operating mode when an object is in the proximate zone.

The method according to the invention can end with the triggering of a signal for starting the authentication check. However, the method according to the invention can also comprise additional steps c) and d) up to and including the provision of an operating signal, in particular for opening and/or closing a movable part.

For example, the access control system preferably sends a wakeup signal to the ID transmitter. The ID transmitter then relays an authentication code to the access control system of the motor vehicle. The access control system thereupon compares the authentication code with a stored code. Given a match, a signal, in particular an unlocking signal and/or a signal for monitoring an actuation region, can be triggered. Steps c) and d) can then be performed.

Also protected is a method that can be implemented with an assembly module according to the invention, as well as an assembly module that can implement a method according to the invention. To this end, in particular the monitoring unit can comprise a processor and a memory, which can be used to implement the method according to the invention. The method according to the invention can be stored in the memory.

Figure 2:
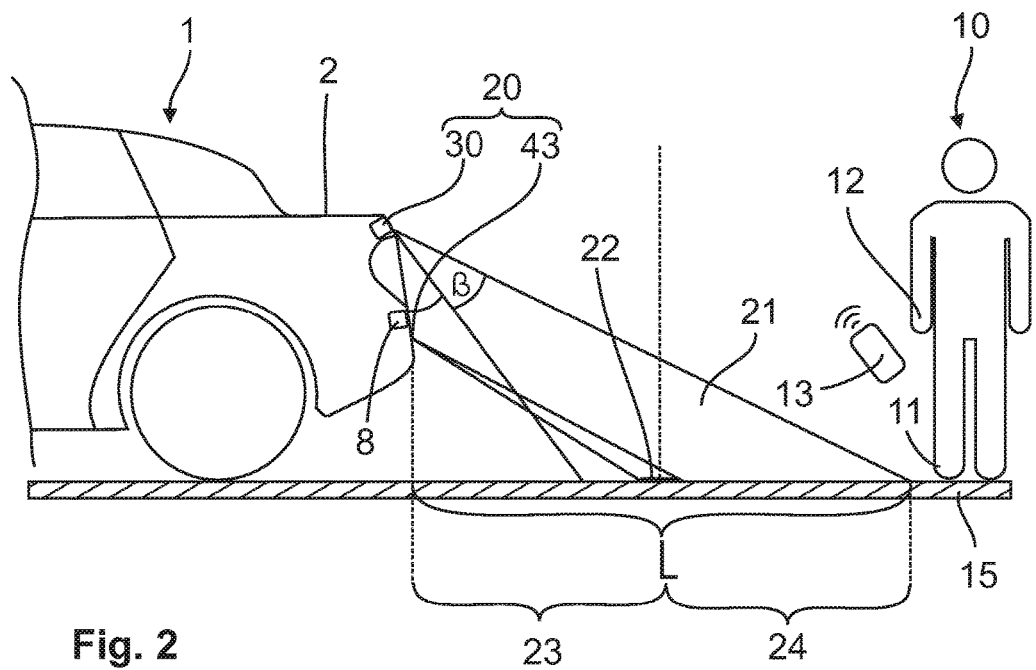
Figure 3:
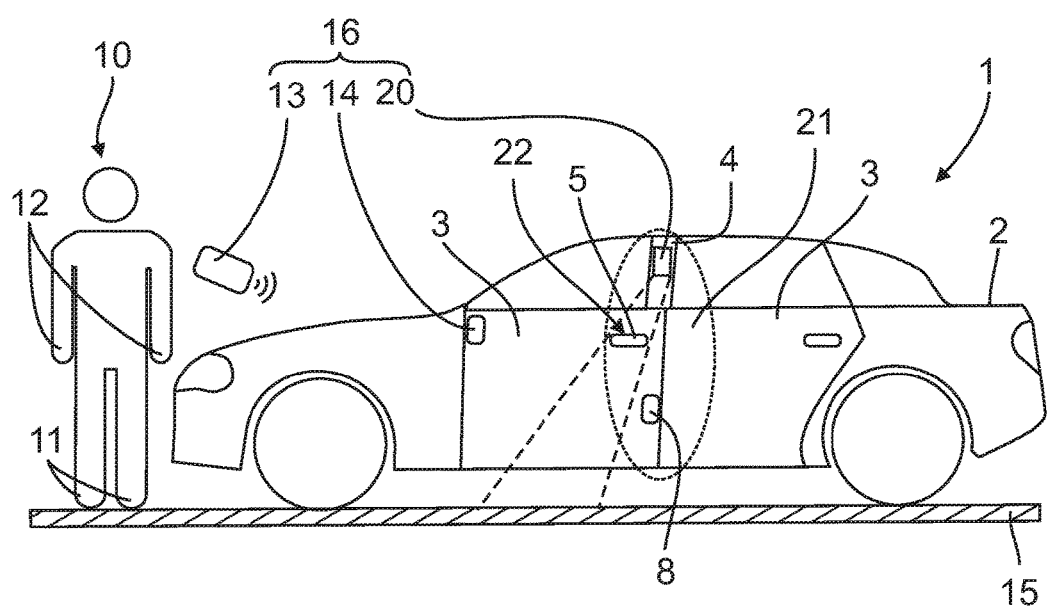
Figure 4:
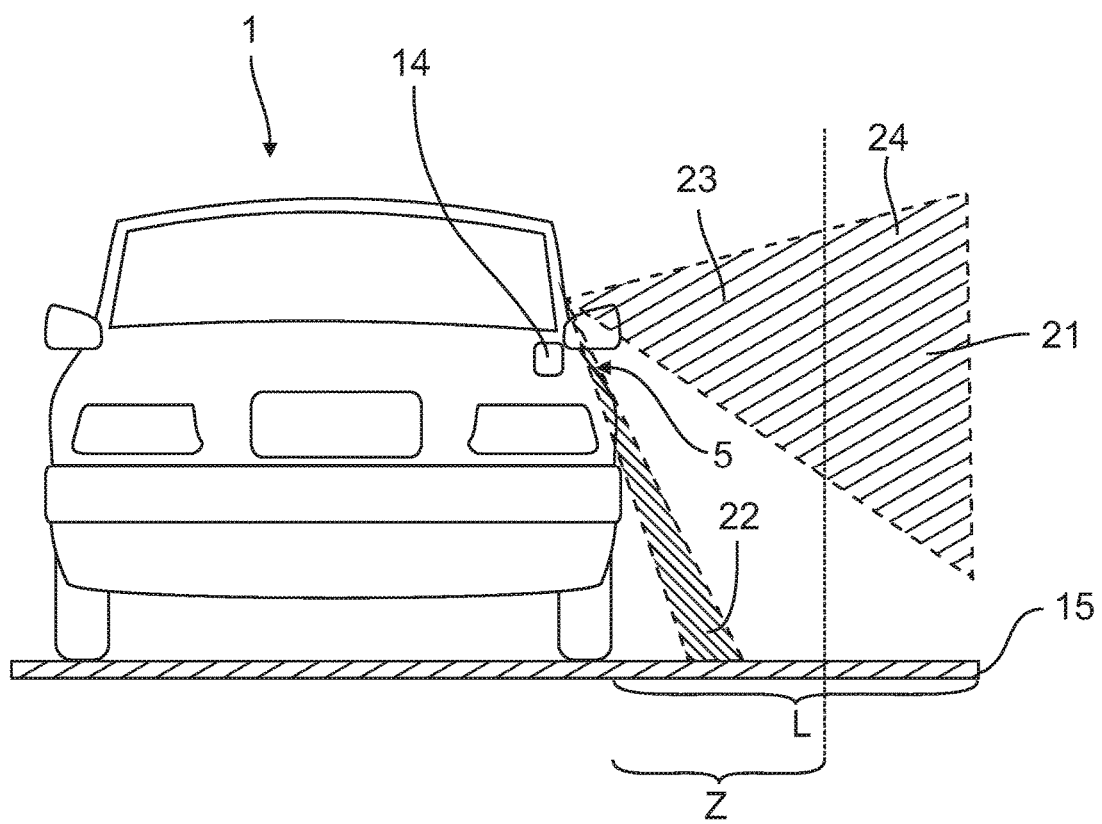
Figure 5:
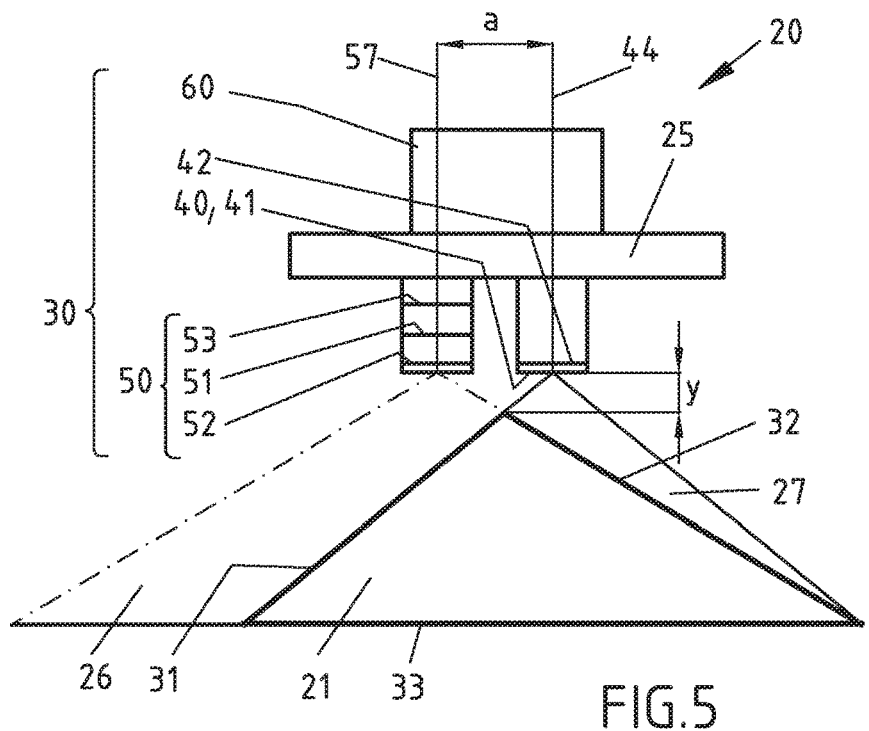
Figure 6:
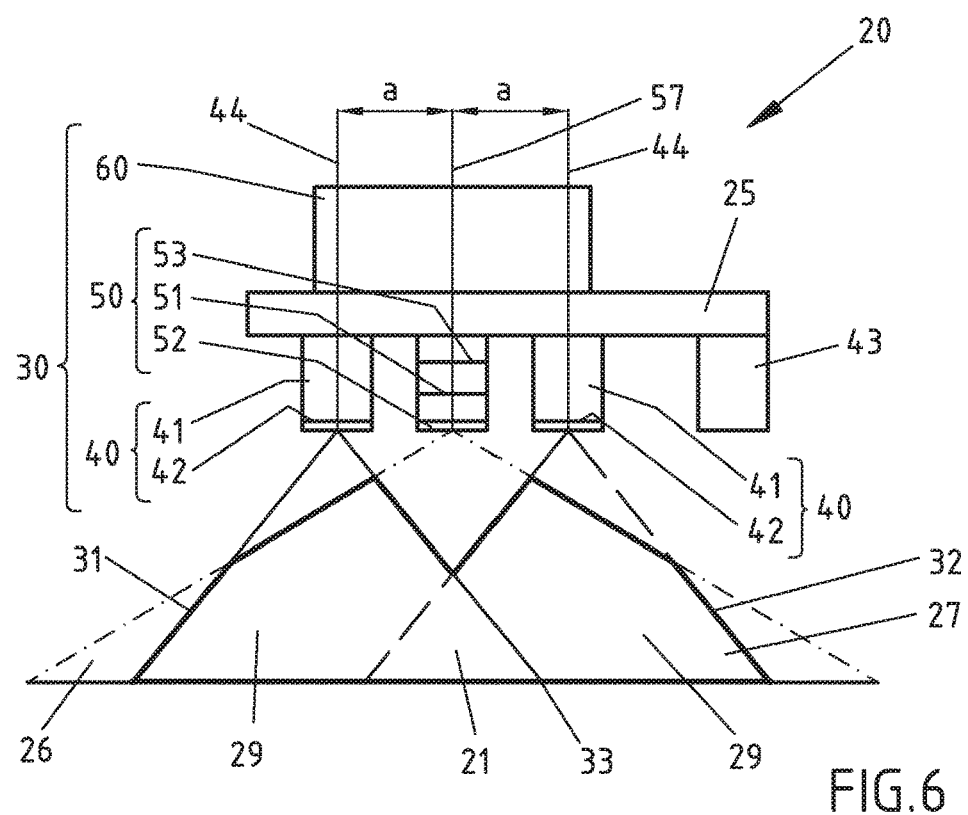
Figure 7:
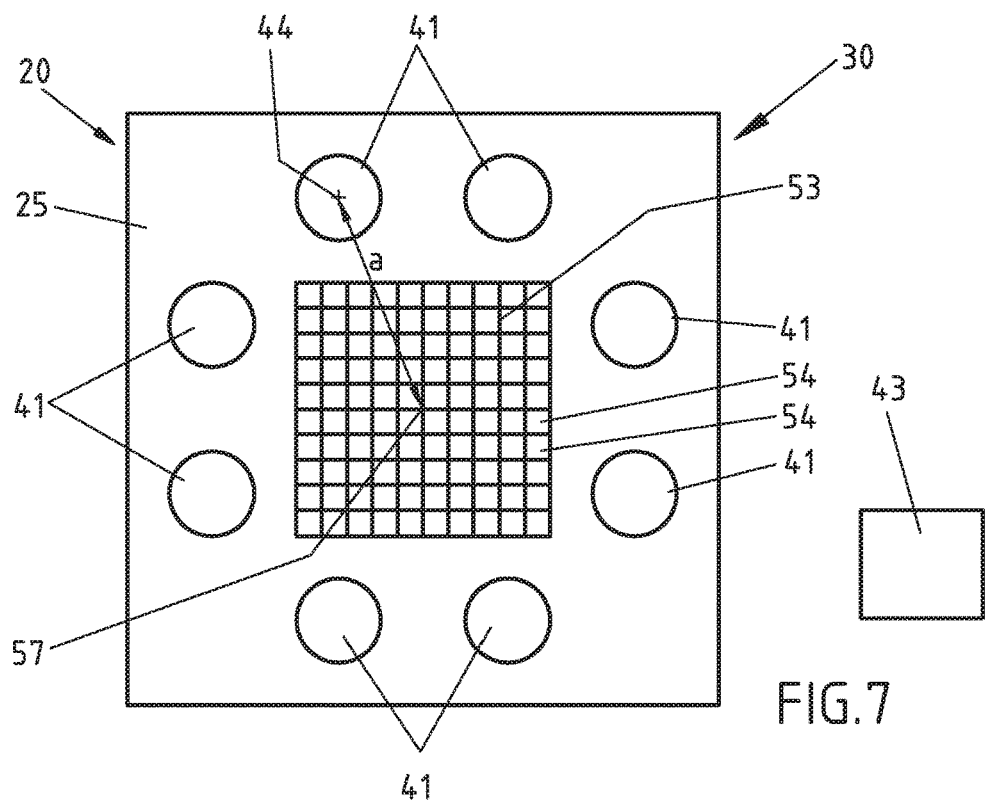
Figure 8:
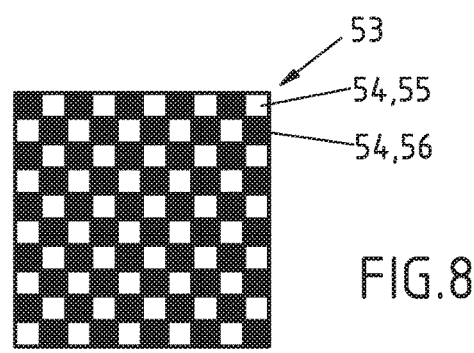
Figure 9:
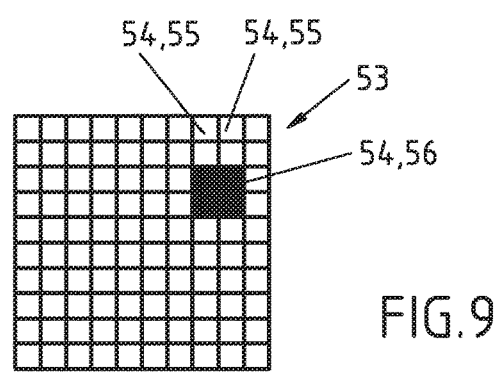
Figures 10, 11:
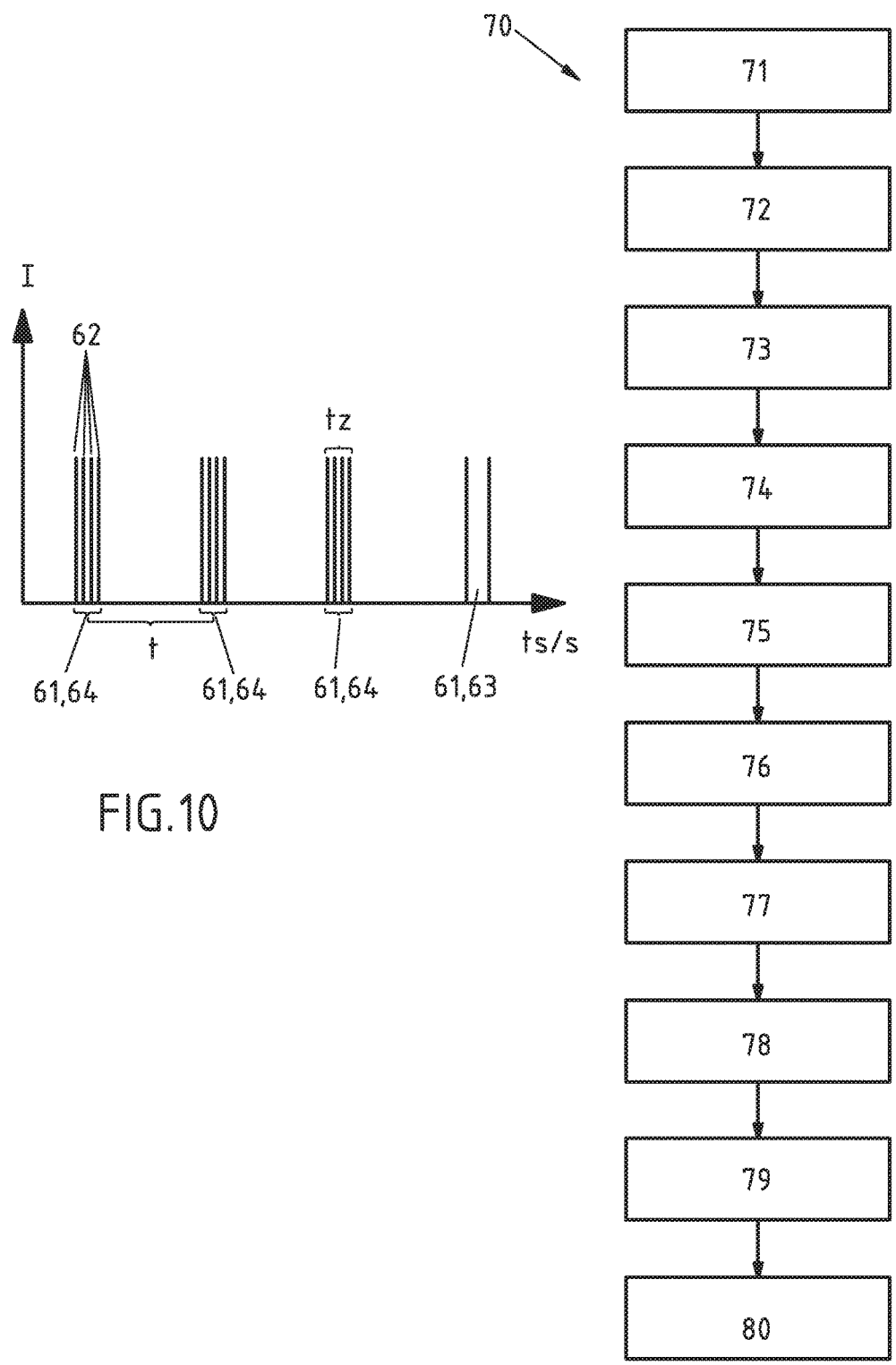

Additional measures that improve the invention can be gleaned from the following description of exemplary embodiments of the invention, which are schematically depicted on the figures. All features or advantages presented in the claims, specification or drawing, including structural details, spatial arrangements and procedural steps, can be essential to the invention whether taken in isolation or in a wide variety of combinations. Shown on:

FIG. 1 is a top view of a rear area of a motor vehicle with an assembly module according to the invention and an authentication system according to the invention, FIG. 2 is a side view of the rear area from FIG. 1, FIG. 3 is a side view of the side area of a motor vehicle with an assembly module according to the invention and an authentication system according to the invention, FIG. 4 is another side view of the assembly module from FIG. 3, FIG. 5 is a top view of a first assembly module according to the invention, FIG. 6 is a top view of a second assembly module according to the invention, FIG. 7 is a front view of a third assembly module according to the invention, FIG. 8 is a view of an image sensor from FIG. 7, which illustrates how a monitoring unit of an assembly module according to the invention can evaluate the image sensor, FIG. 9 is another view of the image sensor from FIG. 7, which illustrates another way the monitoring unit can evaluate the image sensor, FIG. 10 is a view of the radiation intensity over time, which is emitted by an assembly module according to the invention, and FIG. 11 is a method according to the invention.

Elements with the same function and mode of action are marked with the same reference numbers on the figures.

FIGS. 1 and 2 on the one hand and FIGS. 3 and 4 on the other each show how an assembly module 20 according to the invention and an authentication system 16 according to the invention are used in a motor vehicle 1. FIGS. 1 and 2 here depict usage in a rear area of a motor vehicle 1 with a tailgate 2. The optical sensor system 30 of the assembly module 20 is arranged in the area of the tailgate 2, e.g., in a handle strip of the tailgate 2. By the optical sensor system 30 a detection region 21 lying outside of the motor vehicle 1 is generated. With the motor vehicle 1 parked, the optical sensory system 30 continuously monitors the detection region 21. If a user 10 still depicted outside of the detection region 21 on FIGS. 1 and 2 approaches the motor vehicle 1 and optical sensor system 30 with an ID transmitter 13, the user 10 enters into the detection region 21. If the user 10 is recognized in the detection region 21, a signal is preferably triggered to start an authentication check.

Because the optical sensor system 30 recognizes that a user 10 is approaching the motor vehicle 1, and because a signal to start the authentication check is triggered given a recognition of the user 10 in the detection region 21, the user need not become active to initiate the authentication check. As a consequence, the user 10 need not hold the ID transmitter 13 in one hand, with it rather sufficing to keep the ID transmitter 13 in a pocket on his or her person, for example. Therefore, this case involves a passive-keyless-entry check.

Because an optical sensor system 30 monitors the detection region 21, it can be ensured on the one hand that the signal for starting the authentication check is triggered before the user 10 reaches the motor vehicle 1. In this case, the authentication check is usually completed before the user 10 has approached closer to the motor vehicle than a first actuation region 22. On the other hand, the detection region 21 is confined to a predefined space section, for example that only comprises a few m² as viewed from the top, so that the signal for starting the authentication check is only rarely triggered. As a result, the signal for starting the authentication check can be triggered in timely and targeted manner.

In a top view, the detection region 21 comprises two rays 31, 32, which approach each other toward the optical sensor system 30. The detection region 21 likewise comprises a base 33, which borders the detection region 21 on the side of the detection region 21 facing away from the optical sensor system 30. The detection region 21 ends at the base 33. The base 33 is straight in design. The two rays 31, 32 form an angle α. The fact that the detection region 21 tapers in the direction of the motor vehicle 1 makes it possible to achieve the timely and yet rare triggering of the signal for starting an authentication especially well.

The angle α on FIG. 1 measures between 30° and 60°. This prevents a user 10 walking by the side of the motor vehicle 1 from entering into the detection region 21. A length L resulting from the distance between the base 33 and optical sensor system 20 measures 1.5 m. The length L and angle α also yield x as the maximum distance between a point in the detection region 21 and the optical sensor system 30. The selected parameters limit the detection region 21, so that only a little electrical power is required for monitoring the detection region 21. As shown on FIG. 2, the detection region 21 ends on a floor surface 15 on which the motor vehicle 1 is parked. As a result, the detection region 21 comprises an inclined truncated cone. An angle β depicted on FIG. 2 corresponds to an angle of the detection region 21 in a side view. The selected angle α is here not equal to angle β, so that the detection region has an elliptical design.

Another way of using only a little electrical power is provided by dividing the detection region 21 into a remote zone 24 and a proximate zone 23, wherein the proximate zone 23 is spaced a smaller distance apart from the sensor system 30 than the remote zone 24. If the user 10 initially enters the remote zone 24, the optical sensor system 30 determines that an object is located in the remote zone 24. The optical sensor system 30 further checks whether the object has a predefined size. If the object comprises the predefined size, and if the object is located in the proximate zone 23 of the detection region 21, the distance between the object and an optical sensor 50 is also measured in the proximate zone 23 to ascertain whether the object is approaching the optical sensor 50. If the answer is affirmative, the user 10 is recognized, and a signal is triggered for starting an authentication check between the ID transmitter 13 and an access control system 14 of the motor vehicle 1.

The signal prompts the access control system 14 to send a wakeup signal to the ID transmitter 13. The ID transmitter 13 then relays an authentication code to the access control system 14. The access control system 14 compares the authentication code with a stored code. If the two codes match, authentication is successful, and an unlocking signal is triggered. This case can involve an unlocking signal for all doors of the motor vehicle 1, or just one unlocking signal for the tailgate 2.

FIGS. 1 and 2 further depict the first actuation region 22. After a successful authentication, the optical sensor system 30 monitors the first actuation region 22. If the user 10 now performs a predefined motion in the first actuation region 22, for example stepping into the first actuation region 22 with one foot 11 for a certain period of time and within a predefined actuation duration b, an operating signal is triggered. The operating signal is a signal for opening the tailgate 2. It may here only be that a door lock 8 of the tailgate 2 is unlocked, and springs open easily upon exposure to the pressure of a gasket. On the other hand, it is conceivable for a motorized opening aid to simultaneously be activated by the operating system, so that the tailgate 2 opens completely.

The actuation region 22 is visible on the floor surface 15. Provided to this end is a first display element 43, which makes the actuation region 22 visible to the user 10. For this purpose, the first display element 43 can emit visible light. The first display element 43 is activated after a successful authentication. The first actuation region 22 lies within the proximate zone 23 of the detection region 21 on FIGS. 1 and 2. The actuation region 22 has smaller spatial dimensions than the detection region 21.

It can be that the first actuation region 22 is the only actuation region. A second actuation region 28 is depicted as an option, and hence shown with dashed lines on FIG. 1. In this case, a user 10 must perform a predefined motion in both actuation regions 22, 28 within a predefined actuation duration b to provide the operating signal. A second display element 45 of the assembly module 20 serves to visualize the second actuation region 28.

FIGS. 3 and 4 present another exemplary embodiment for how the assembly module 20 according to the invention is used. Unless otherwise explained below, the mode of action and function of the assembly module 20 depicted on FIGS. 3 and 4 correspond to the mode of action and function of the assembly module 20 depicted on FIGS. 1 and 2.

The assembly module 20 on FIGS. 3 and 4 is arranged in a B-pillar 4 of a vehicle side. An approach toward a side door 3 of the motor vehicle 1 is monitored via the detection region 21. The operating signal can serve to open the side door 3. The predefined motion for providing the operating signal can be a predefined motion by a hand 12 of the user 10 in the area of a door handle 5.

As opposed to the exemplary embodiment on FIGS. 1 and 2, the detection region 21 lying outside of the motor vehicle 1 is located completely over the floor surface 15 in the exemplary embodiment shown on FIGS. 3 and 4. The detection region 21 comprises a flat base surface. The actuation region 22 in the exemplary embodiment on FIGS. 3 and 4 comprises the area of the door handle 5. The sole actuation region 22 lies outside of the detection region 21.

FIG. 5 presents a top view of a first exemplary embodiment of an assembly module 20 according to the invention. The assembly module 20 comprises an installation plate 25 as an attachment element, and an optical sensor system 30. The optical sensor system 30 comprises a light module 40, which on FIG. 5 is designed as a single light source 41. The light source 41 emits infrared light, thereby creating a transmitting region 27. The shape and design of the transmitting region 27 is achieved by means of a lens system 42 of the light source 41, which is only shown schematically. The optical sensor system 30 additionally comprises an optical sensor 50, which can receive light from a receiving region 26. The shape and design of the receiving region 26 is predefined by a schematically depicted lens system 51 of the optical sensor 50. The detection region 21 shown with thicker lines is here obtained by overlapping the transmitting region 27 with the detection region 26. The detection region 26 here completely covers the transmitting region 27. The detection region 21 begins at a distance y from the optical sensor system 30. A base 33 of the detection region 21 results from the diminishing light intensity of the light source 41.

The optical sensor 50 comprises an infrared filter 52 so as to filter out light of different wavelengths. The optical sensor further comprises an image sensor 53, on which the image comes about. A monitoring unit 60 serves to evaluate the optical sensor 50. The optical sensor 50, light module 40 and monitoring unit 60 are fastened to the installation plate 25.

An optical axis 57 of the optical sensor 50 and an optical axis 44 of the light source 41 are spaced apart from each other by a distance of a=2 cm. This yields more of an overlap of the transmitting region 27 with the detection region 26.

The assembly module 20 on FIG. 5 has no display element 43. The assembly module 20 on FIG. 5 is only used for monitoring the detection region, and for triggering the start of the authentication check.

The detection region 21 on FIG. 5 results from the transmitting and receiving region 26, 27 completely overlapping, and thus corresponds to the exemplary embodiment on FIGS. 1 and 2, in which the actuation region 22 is located within the detection region 21. It is likewise conceivable for the detection region 21 and actuation region to each only comprise a portion of the overlap between the transmitting and receiving region 26, 27, as reflected by the exemplary embodiment on FIGS. 3 and 4.

Shown on FIG. 6 is a second exemplary embodiment of an assembly module 20 according to the invention. Unless otherwise indicated, the second exemplary embodiment corresponds with the first exemplary embodiment, with the difference being explained below.

In the second exemplary embodiment, the light module 40 comprises two light sources 41, which are each situated to the right and left of the optical sensor 50. Each of the light sources 41 has a transmitting region 29, wherein the transmitting regions of both light sources 41 form the transmitting region 27 of the light module 40. The detection region 21 depicted with thicker lines is created by overlapping the transmitting region 27 of the entire light module 40 with the receiving module 26 of the optical sensor 50.

The assembly module 20 comprises a display element 43 in order to visibly display the actuation region 22. The display element 43 is secured to the installation plate 25. The optical sensor system 30 in the second exemplary embodiment is suitable for monitoring the actuation region 22, and, in the event a user intention is recognized, providing an operating signal.

Shown on FIG. 7 is a front view of a third exemplary embodiment of an assembly module 20 according to the invention. Unless otherwise indicated below, the third exemplary embodiment corresponds to the second exemplary embodiment.

In the view presented on FIG. 7, the lens system 51 and infrared filter 52 have been removed from the view. This reveals an image sensor 53 of the optical sensor 50. The image sensor 53 comprises a plurality of pixels 54 in the form of a grid.

The light module 40 in the third exemplary embodiment on FIG. 7 comprises a plurality of light sources 41. The latter are arranged around the circumference of the image sensor 53. The assembly module 20 further comprises a display element 43, which is not secured to the installation plate 25. The display element 43 can instead be secured to a more remote location of the motor vehicle 1. The monitoring unit 60 (not shown) is formed together with the access control system 14.

FIG. 8 shows the image sensor 53 of an optical sensor 50, illustrating how an image 61 of the optical sensor system 30 recorded on the image sensor 53 in a sleep mode is evaluated. As depicted, only each second pixel 54 is evaluated. In particular, unevaluated pixels 55 alternate with evaluated pixels 56, yielding a checkered-like, regular pattern. By contrast, the total number of pixels 54 is evaluated in an operating mode.

FIG. 9 shows the image sensor 53, illustrating how the recorded images 61 are evaluated while the optical sensor system 30 monitors the actuation region 22. Only pixels 54 on which the actuation region 22 is imaged are evaluated, so that these pixels 54 correspond to the evaluated pixels 56. The remaining pixels 54 are unevaluated pixels 55.

FIG. 10 contains an application of a light intensity I over time ts. As depicted on FIG. 10, the image sensor 53 is used to record an image 61 after each timespan t, wherein the respective timespan required for an image 61 is shown on FIG. 10. A recognition image 64 or a comparison image 63 can be involved here. The recognition image 64 was recorded by means of light pulses 62 of the light module 40. In this case, a plurality of light pulses 62 is required to generate an image 61. The light pulses 62 are emitted by the light module 40 with a predefined pulse frequency. The pulse frequency during the sleep mode can here be lower than that of the operating mode. Likewise, the frame rate produced by timespan t can be lower in a sleep mode than in an operating mode.

The light of the light pulses 62 of an image 61 received by the image sensor 53 is integrated or summed, so as to generate the image 61. In order to perform a distance measurement, the optical sensor system 30 prescribes a time interval tz, in which the light pulses 62 generate an image 61. The distance between the user 10 and optical sensor 50 is determined as a function of the intensity of the light pulses 62 in time interval tz. An image 61 is recorded in the comparison image 63 without light pulses 62 of the light module 40 reaching the image sensor 53. To this end, the light module 40 emits no light.

FIG. 11 shows a method 70 according to the invention. In a first step 71 of the method 70 according to the invention, the optical sensor system 30 begins to monitor the detection region 21. In a second procedural step 72, the optical sensor system 20 discovers an object, in particular a user 10, in the remote zone 24. The optical sensor system 30 checks the size of the object in the remote zone 24 in procedural step 73.

If the object has moved into the proximate zone 23, and if procedural step 73 revealed that the size of the object corresponds to a predefined size, several distance measurements in the proximate zone 23 are performed in procedural step 74 to check whether the distance between the object and optical sensor 50 is diminishing. If the distance to the optical sensor 50 is diminishing, monitoring of the detection region 21 is ended, and a signal for starting an authentication check is triggered in procedural step 75.

After procedural step 75, the method according to the invention can end. Procedural steps 71 to 74 here correspond to step a), and procedural step 75 corresponds to step b). Additional procedural steps can optionally be provided. For example, an authentication check described above can be performed in a procedural step 76.

After a successful authentication, the optical sensor system 30 can receive a signal in procedural step 77 to monitor the actuation region 22 for an actuation duration b in procedural step 78. If a predefined movement is performed during the actuation duration b, the user intention in the actuation region 22 can be recognized in procedural step 79. To this end, distance measurements are performed in the actuation region 22. In procedural step 80, which corresponds to procedural step d), an operating signal is hereafter provided for opening a movable part 2, 3. Procedural steps 78 and 79 here correspond to step c).

REFERENCE LIST

1 Motor vehicle
2 Tailgate (movable part)

3 Side door (movable part)
4 B-pillar
5 Door handle
8 Door lock
10 User
11 Foot
12 Hand
13 ID transmitter
14 Access control system
15 Floor surface
16 Authentication system
20 Assembly module
21 Detection region
22 First actuation region
23 Proximate zone
24 Remote zone
25 Attachment element
26 Receiving region
27 Transmitting region of 40
28 Second actuation region
29 Transmitting region of 41
30 Optical sensor system
31 Ray
32 Ray
33 Base
40 Light module
41 Light source of 30
42 Lens system for 30
43 First display element
44 Optical axis of 41
45 Second display element
50 Optical sensor
51 Lens system of 50
52 IR filter
53 Image sensor
54 Pixel
55 Unevaluated pixels
56 Evaluated pixels
57 Optical axis of 50
60 Monitoring unit
61 Image
62 Light pulse
63 Comparison image
64 Recognition image
70 Method
71 Procedural step
72 Procedural step
73 Procedural step
74 Procedural step
75 Procedural step
76 Procedural step
77 Procedural step
78 Procedural step
79 Procedural step
80 Procedural step
α Angle of 21
β Angle of 21
L Length of 21
x Maximum distance between 21 and 30
y Minimum distance between 21 and 30
a Distance between 44 and 57

The invention claimed is:
1. An assembly module for a motor vehicle, comprising:
an optical sensor system comprising:
  an optical sensor;
  a source of light; and
  a monitor configured to evaluate images recorded by the optical sensor, wherein the optical sensor system is configured to
a) monitor an image of a detection region lying outside of the motor vehicle so as to determine a proximity of a user, and
b) trigger a signal, in the event the user is detected in the detection region, for starting an authentication check between an ID transmitter and an access control system of the motor vehicle,
wherein
the optical sensor receives light from the detection region,
the source of light comprises at least one light source emitting light in a transmitting region,
the images each comprise a plurality of pixels,
the detection region is formed by overlapping the transmitting region of the source of light and a receiving region of the optical sensor,
the optical sensor system is switchable between a sleep mode and operating mode, wherein a frame rate is lower in the sleep mode than in the operating mode, and
the light has a predefined pulse frequency which comprises a plurality of light pulses emitted by the source of light over time, wherein the pulse frequency of the light is lower in the sleep mode than in the operating mode.
2. The assembly module according to claim 1,
wherein
the optical sensor system introduces a passive-keyless entry check.
3. The assembly module according to claim 1,
wherein
the detection region is located at least partially above a floor surface on which the motor vehicle is standing.
4. The assembly module according to claim 1,
wherein the detection region is not visible to the user.
5. The assembly module according to claim 4,
wherein
the optical sensor system is configured to record recognition images produced by the reflected light of the source of light and comparison images produced without the reflected light of the source of light via extraneous light, and to evaluate the latter so as to generate a modified recognition image from which the extraneous light has been removed.
6. The assembly module according to claim 1,
wherein
the optical sensor system is configured to monitor the detection region with the motor vehicle parked, from the time the motor vehicle is parked until authentication is successful.
7. The assembly module according claim 1,
wherein
the detection region comprises two rays as viewed from above, which form an angle α of $30°≤α≤110°$.
8. The assembly module according to claim 1,
wherein a frequency of evaluating the images recorded by the optical sensor is lower in the sleep mode than in the operating mode.
9. The assembly module according to claim 4,
wherein
only a portion of the image recorded by the optical sensor is evaluated in step a) while monitoring the detection region, in particular during the sleep mode.
10. The assembly module according to claim 1,
wherein a user in the detection region is only recognized at least if an object is located in the detection region for a predefined period of time or if an object of a predefined size is located in the detection region.

11. The assembly module according to claim 1, wherein
a user in the detection region is only recognized if an object moves in the detection region, in particular that the object in the detection region approaches the optical sensor.

12. The assembly module according claim 1, wherein
the detection region is divided into at least two zones, into a proximate zone and remote zone, wherein the proximate zone is spaced a smaller distance apart from the optical sensor system than the remote zone, wherein in particular the optical sensor is in the sleep mode when the object is located in the remote zone, and in the operating mode when the object is located in the proximate zone.

13. The assembly module according to claim 12, wherein
the user is only recognized when the user is located in the proximate zone.

14. The assembly module according to claim 4, wherein
the source of light comprises several light sources.

15. The assembly module according to claim 1, wherein
the optical sensor system is configured to
c) monitor an actuation region that differs from the detection region and lies outside of the motor vehicle upon successful authentication,
d) provide an operating signal for the motor vehicle in the event a user intention in the actuation region has been recognized, in particular a signal for at least opening or closing a movable part.

16. The assembly module according to claim 1, wherein
the actuation region is visible to the user, wherein the assembly module comprises a display with which the visible light can be emitted to make the actuation region visible to the user.

17. The assembly module according to claim 1, wherein
a predefined motion must take place within an actuation duration b in order to recognize the user intention, wherein the predefined motion in particular involves at least a motion of a body part of the user in or on the actuation region or a motion of the body part at least into the actuation region or out of the actuation region.

18. The assembly module according to claim 1, wherein
the detection region comprises a larger spatial expansion than the actuation region as viewed from above, wherein the actuation region is located within the detection region in particular as viewed from above.

19. The assembly module according to claim 1, wherein
at least the optical sensor or the source of light monitor both the detection region and the actuation region.

20. The assembly module according claim 4, wherein
at least the optical sensor or the source of light comprise a rigid lens system.

21. The assembly module according to claim 7, wherein the angle α is $30° \leq \alpha \leq 90°$.

22. The assembly module according to claim 7, wherein the angle α is $30° \leq \alpha \leq 60°$.

23. The assembly module according to claim 1, wherein the source of light emits several light pulses in succession to generate the image, wherein the light pulses are integrated or summed for generating the image.

24. An authentication system comprising:
an access control system;
an ID transmitter; and
an assembly module for a motor vehicle,
wherein the assembly module comprises:
an optical sensor system comprising:
an optical sensor;
a source of light; and
a monitor configured to evaluate images recorded by the optical sensor,
wherein the optical sensor system is configured to
a) monitor an image of a detection region lying outside of the motor vehicle so as to determine a proximity of a user, and
b) trigger a signal, in the event the user is detected in the detection region, for starting an authentication check between an ID transmitter and an access control system of the motor vehicle,
wherein
the optical sensor receives light from the detection region,
the source of light comprises at least one light source emitting light in a transmitting region,
the images each comprise a plurality of pixels,
the detection region is formed by overlapping the transmitting region of the source of light and a receiving region of the optical sensor,
the optical sensor system is switchable between a sleep mode and operating mode, wherein a frame rate is lower in the sleep mode than in the operating mode, and
the light has a predefined pulse frequency which comprises a plurality of light pulses emitted by the source of light over time, wherein the pulse frequency of the light is lower in the sleep mode than in the operating mode.

25. A method for triggering at least one signal for a motor vehicle, the method comprising:
a) monitoring an image of a detection region lying outside of the motor vehicle by an optical sensor system, so as to determine the proximity of a user; and
b) triggering a signal for starting an authentication check between the ID transmitter and an access control system of the motor vehicle in the event the user is recognized in the detection region,
wherein the optical sensor system comprises:
an optical sensor;
a source of light; and
a monitor configured to evaluate images recorded by the optical sensor,
wherein
the optical sensor system receives light from the detection region,
the source of light comprises at least one light source emitting light in a transmitting region,
the images each comprise a plurality of pixels,
the detection region is formed by overlapping the transmitting region of the source of light and a receiving region of the optical sensor,
the optical sensor system is switchable between a sleep mode and operating mode, wherein a frame rate is lower in the sleep mode than in the operating mode, and the light has a predefined pulse frequency which comprises a plurality of light pulses emitted by the source of light over time, wherein the pulse frequency of the light is lower in the sleep mode than in the operating mode.

26. The method according to claim 25,
wherein
the method can be implemented with an assembly module for a motor vehicle, with
an optical sensor system configured to
a) monitor an image of a detection region lying outside of the motor vehicle so as to determine a proximity of a user, and
b) trigger a signal, in the event the user is detected in the detection region, for starting an authentication check between an ID transmitter and an access control system of the motor vehicle.

\* \* \* \* \*